Oct. 25, 1966  E. J. SAXL  3,280,623
LOAD CELL FOR MEASUREMENT OF LOW FORCES
Filed April 10, 1964  2 Sheets-Sheet 1
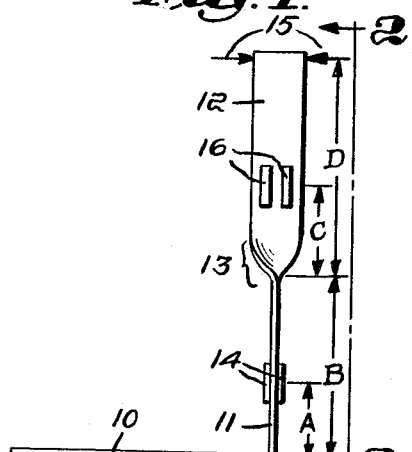
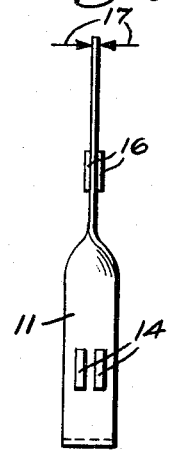
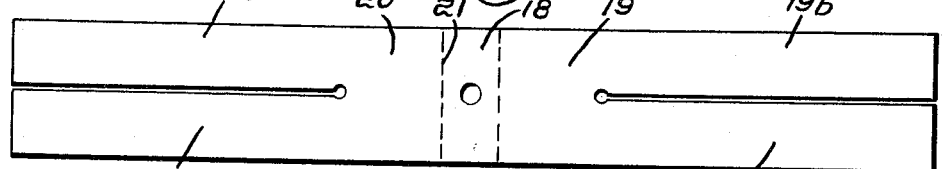
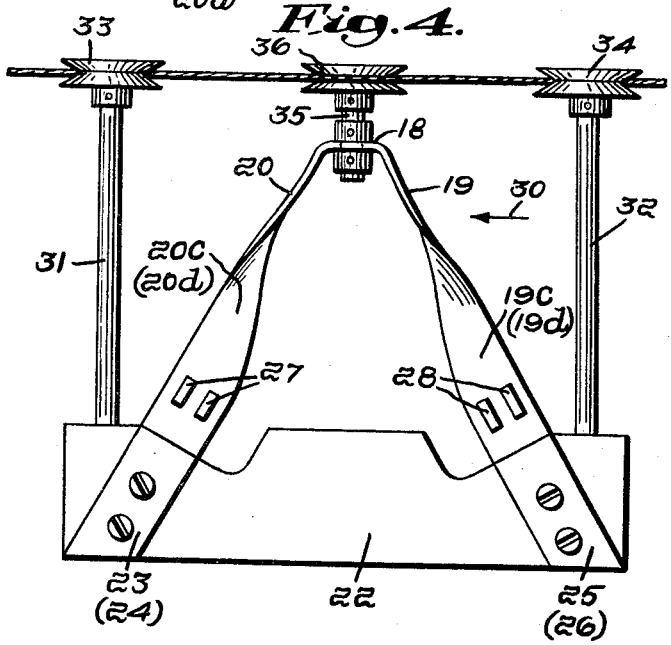
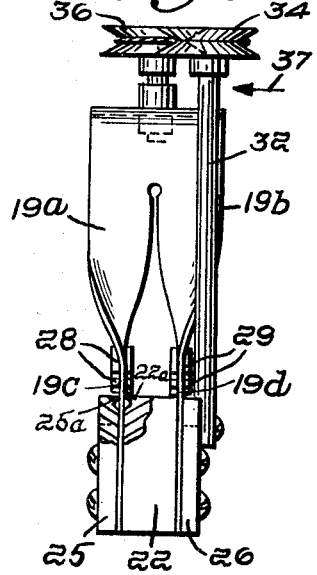
Inventor:
Erwin J. Saxl,
by Arthur D. Thomson
Attorney Oct. 25, 1966 E. J. SAXL 3,280,623
LOAD CELL FOR MEASUREMENT OF LOW FORCES
Filed April 10, 1964 2 Sheets-Sheet 2
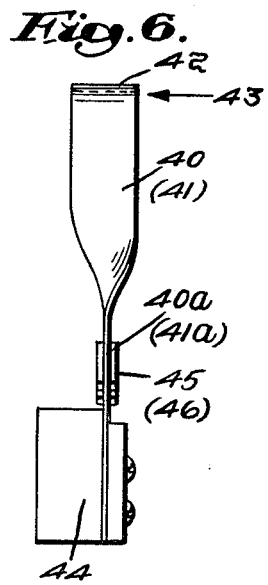
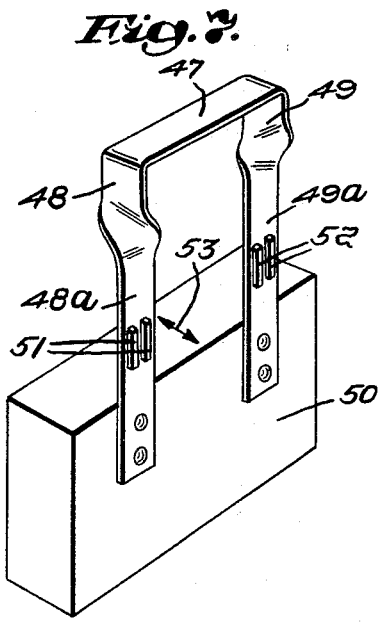
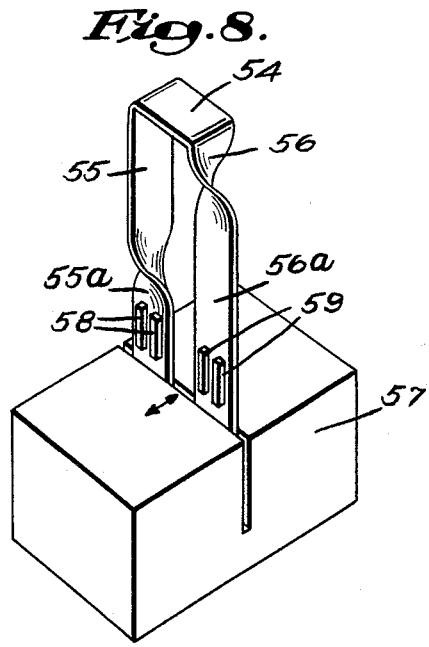
Inventor:
Erwin J. Saxl,
by Arthur D. Thomson
Attorney

3,280,623
LOAD CELL FOR MEASUREMENT OF LOW FORCES
Erwin J. Saxl, Harvard, Mass.
Filed Apr. 10, 1964, Ser. No. 358,848
13 Claims. (Cl. 73—141)

This invention relates to load cells for measuring very small forces, and rapidly fluctuating forces, and pertains more particularly to load cells for use with measuring devices such as electrical strain gages which measure force applied to a cell in terms of strain in the cell surface on which the gage is mounted.

Electric strain gages of the type known as bonded strain gages, for which the load cells here described are especially suited, consist essentially of a flat, fine wire grid embedded in insulation. The gage is bonded to the surface of a column or beam, to which a force to be measured is applied; and distortion of the grid due to strain in the surface results in a proportionate change in the resistance of the gage. The column type of load cell cannot be made sufficiently sensitive to measure forces lower than about ten pounds tension or compression. A cantilever beam is capable of much greater sensitivity. In this arrangement, the beam is fixed at one end and the force to be measured is applied to the free end, and one or more strain gages are bonded to the surface of the beam between the fixed end and free end. A simple beam, flexible enough to give adequate response to very small forces, however, tends to deflect in planes other than the plane of the applied force and is sensitive to vibration, and has a natural vibratory frequency of its own which distorts the measurement of fluctuating forces in the region of the natural frequency and its harmonics.

The principal object of this invention is to provide a cantilever beam type of load cell which is extremely sensitive in a single plane and highly resistant to deflection in any other plane. Another object is to provide a beam which is relatively insensitive to vibration over a wide range of frequencies. Still another object is to provide a beam capable of simultaneously measuring forces in two planes or resolving a force into components at right angles to one another. Other objects are to achieve high sensitivity, stability, and uniformity of flexural characteristics in a cell of simple construction and low cost.

The load cell, in all the forms here disclosed, is formed from a single strip of spring material such as beryllium copper twisted transversely at right angles between the fixed end of the beam and the point of application of the load. The simplest form of cell is a single straight beam with a twist in the central region. In a modification, the strip is bent to form two legs of a triangle and has a twist in each leg. The ends of the legs are fixed to a base and the load is applied at the apex. In another modification the strip is bent to form three legs of a rectangle. The ends of the strip are fixed and the side legs are twisted. The load is applied to the end leg. The formation of the entire cell from a single strip, with no brazing or joining insures uniformity of the fluxural characteristics of the beam. The strip is disposed edgewise to the direction of the load at the point of application of the load and presents high resistance to bending at that point. The deflection is concentrated in the regions between the right angle twists and the fixed mounting where the strip lies perpendicular to the load, and where the strain gage or gages are mounted. Other objects, advantages and novel features will be apparent from the following detailed description.

In the drawings illustrating the invention:

FIG. 1 is a side view of a load cell constructed according to the invention;

FIG. 2 is a view taken in the direction of line 2—2 of FIG. 1;

FIG. 3 is a plan view of a blank for making a modified form of load cell;

FIG. 4 is a side view of a load cell made from the blank of FIG. 3, illustrated, by way of example, as used in a yarn tension meter;

FIG. 5 is a view taken in the direction of line 5—5 of FIG. 4;

FIG. 6 is an end view of another modification of the load cell; and

FIGS. 7 and 8 are perspective views of other modifications of the load cell.

The load cell shown in FIGS. 1 and 2 is made from a single, initially straight strip of beryllium copper and has a base leg 10 bent at right angles to an intermediate portion 11. The strip has a right angle transverse twist in the region 13 so that the end portion 12 of the strip lies in a plane at right angles to portion 11.

A bank of four strain gages 14 is mounted on portion 11, two on each face of the strip. These gages are preferably of the etched foil type. It is understood that a single gage will suffice for measurement of strain in the beam, but the use of these gages in pairs, on both the compression side and the tension side of the beam, yields a higher signal output and gives a better averaging of errors. Also, one pair of gages may be used to measure change in the applied force and the other to measure rate of change, in conjunction with appropriate circuitry. The strain gages and associated circuitry for amplifying and measuring change in resistance of the gages due to strain in the beam are well known in the art and are not here illustrated in detail.

To use the load cell, the base leg 10 is attached in any convenient manner to a fixed base or mount. A force applied edgewise to portion 12 causes the beam to bend in portion 11. As the width of the strip is very much larger than its thickness, portion 12 is very rigid in the direction of the applied force, as compared to portion 11, so that substantially all the bending strain is concentrated in portion 11. A high signal to force ratio is thus achieved. Portion 11, likewise, is much more rigid in its edgewise direction than in its flat direction and is thus relatively insensitive to forces in any direction other than perpendicular to its plane.

The load cell just described can also be used for simultaneously measuring forces in two planes at right angles, or for resolving a force into components at right angles, by the addition of a second bank of gages 16 on portion 12. This portion will bend readily under forces applied perpendicular to its plane, in the direction of arrows 17, whereas portion 11 is practically rigid in this direction. A force applied in this direction produces no significant change in the resistance of gages 14. Furthermore the signals of the two gages side by side on each face are normally added together in the output circuit so that the net output remains the same under whatever slight bending of part 11 might take place. The same is true of the bank of gages 16 which produce a net signal substantially independent of forces applied in the direction of arrows 15.

Two independent forces at right angles to each other, when applied to the outer end of the cell, are thus measured independently of one another by the banks of gages 14 and 16. If a single force is applied to the end of the beam in a direction oblique to the planes of portions 11 and 12, the banks of gages will resolve the force into two components at right angles to these planes. Preferably the beam is so proportioned that the resistance change of both sets of gages is the same for equal applied forces. To accomplish this, the ratio of the distance between the fixed end of the beam and the gages to that between the fixed end and the point of application of the load is made the same for both portions 11 and 12. The center of the twist 13 may be considered the fixed end of portion 11 with respect to forces applied in the direction of arrows 17, and the point of application of the load for forces applied in the direction of arrows 15. In FIG. 1 the correct dimensional relationship is $A/B = C/D$. The blank shown in FIG. 3 has a central portion 18, and side portions 19 and 20 which are slit from their ends part-way toward the center to form pairs of legs 19a, 19b and 20a, 20b. The strip is bent along dotted lines to triangular form, as shown in FIG. 4, and the legs of each pair are twisted in opposite directions to one another, as shown in FIG. 5, to form portions 20c, 20d and 19c and 19d which lie in parallel planes perpendicular to the upper parts of the legs, and central portion 18. Preferably the strip is bent to the general form of an equilateral triangle with the legs at 60° to one another. The lower ends of the legs are secured to a rigid base block 22 by mounting plates 23, 24, 25 and 26. Preferably the base block and plates are provided with mating knife edges, as exemplified by edges 22a, 25a in FIG. 5, which grip the associated leg at right angles to the longitudinal direction of the strip. A bank of four strain gages 27 is mounted, two on each surface of leg portion 20c. Another bank of strain gages 28 is mounted on leg portion 19c, a third bank (not visible) on leg portion 20d, and a fourth bank 29 on leg portion 19d.

The load to be measured is applied to portion 18 in a direction perpendicular to the edge of the strip at that point. From the twists in the legs outward the beam is extremely rigid with respect to forces in that direction, whereas the portions 19c, 19d, 20c and 20d are quite flexible. The entire structure is also very rigid with respect to forces imposed from any direction other than that of the force to be measured; that is, in the direction of the arrow 30. The signals of the four sets of gages, sixteen in all, may be added, so that a large output is available. The arrangement of the gages in pairs also compensates for any twisting or unequal bending in the regions of the gages, as in the form of load cell first described. The double leg construction is especially suitable for operating two independent resolving circuits, for example, for measuring simultaneously change of load and rate of change. The double legs provide separate surfaces on which independent banks of gages may be mounted without unduly stiffening the strain sensitive region of the beam, that is, without impairing the sensitivity of the cell.

As for example of an application of the load cell for measuring purposes, the cell of FIGS. 4 and 5 is shown as used for a yarn tension meter. A pair of rigid posts 31 and 32 are fixed to block 22, and carry rollers 33 and 34. A post 35 is fixed to the center of portion 18 of the beam and carries a roller 36. Rollers 33 and 34 are offset from roller 36. The yarn is passed in front of rollers 33 and 34, as viewed in FIG. 4, and behind roller 36, so that the yarn is deflected from a straight path. Tension in the yarn tends to straighten it, resulting in a proportionate bending force in the direction of arrow 37, which is the sensitive direction of the load cell. The resulting strain in the region of the gages yields a signal proportionate to the tension.

The load cell of FIG. 6 is very similar to that of FIGS. 4 and 5 except that it has two legs 40 and 41 (not visible) running obliquely, preferably at an angle of 60° with respect to one another, from central portion 42, and twisted to form portions 40a and 41a which lie in a plane perpendicular to the direction of the applied force, arrow 43. The ends of portions 40a and 40b are secured to a base block 44. A view from the right hand side of FIG. 6 would appear the same as FIG. 4. Two banks of gages 45 and 46 are mounted on portions 40a and 41a respectively. This load cell, like that of FIG. 4, is extremely rigid in all directions except that of the force to be measured, but having only two banks of gages, yields only half the output. The simpler form of triangular gage is useful in many applications for which the lower output is adequate.

The load cell shown in FIG. 7 is rectangular in shape, and has a central portion 47 and two legs 48 and 49 which are twisted to form portions 48a and 49a perpendicular to the edgewise direction of portion 47. The ends of portions 48a and 49a are secured to a base block 50. Banks of strain gages 51 and 52 are mounted on portions 48a and 49a. The force to be measured is applied to 47 in the edgewise direction. This structure is extremely rigid in all directions except that of arrows 53, and thus has the same advantages as the triangular forms of load cell previously described.

FIG. 8 illustrates another rectangular load cell having a central portion 54, and parallel legs 55 and 56 which are twisted to form portions 55a and 56a at right angles to the edgewise direction of the central portion. The ends of portions 55a and 56a are fixed to a base block 57. Banks of strain gages 58 and 59 are mounted on portions 55a and 56a. This cell, like the others, is practically insensitive to forces in any direction except that of the force to be measured, which is applied in the direction of arrows 60.

All of these load cells have a high degree of resistance to extraneous vibrations in directions other than their sensitive directions. Even in the sensitive direction the twist in the beam tends to suppress resonant effects because the natural frequency is not sharply defined as a simple straight beam. There is a possibility, however, that the measured force may under some conditions, when varying at a frequency approaching the natural frequency of the beam in its sensitive direction, set up a sufficient resonance to distort the measurement. In the cell shown in FIG. 8, the legs are twisted at different distances from the base so that portion 56a is longer than portion 55a. The legs, therefore, have different natural frequencies. If the load force should oscillate at the natural frequency of one leg, the other leg will tend to suppress resonant effects in the cell as a whole. In all cases in order to obtain maximum sensitivity, it is desirable to mount the strain gages as close as physical considerations will permit to the base or fixed point of the beam, because this is the region of maximum stress. It is also desirable to make the twists as sharp as possible, and to bring them close to the gages, so as to concentrate the strain in the gage area. It is understood, also, that stops may be mounted in any convenient manner to limit bending of the beam so that the limitations of the gages are not exceeded.

All the load cells here disclosed perform essentially as cantilever beams having an outer portion which is practically rigid with respect to the measured force and an inner portion which is extremely flexible, thus concentrating the strain to provide maximum signal output. The position of the twists and thus the relative proportions of the rigid and flexible portions can be designed to achieve any desired relationship.

All the forming operations on the strip can be readily controlled by standard production techniques, so that cells of uniform response characteristics can be manufactured at low cost. The construction eliminates brazing and other operations which would effect the temper of the spring material so that the uniformity of an accurately rolled and tempered strip can be maintained in the finished cell.

The combination of high stability and high output achieved by this construction, makes it possible to construct cells capable of reliably measuring very low forces. High output is also achieved with a minimum of inertia so that the cells are suitable for measuring rapidly fluctuating forces.

These load cells have been illustrated as used in connection with the electric resistance type of strain gage which may be of the bonded or unbonded types. They are, however, suitable for use with other types of pickups, capable of measuring movement of the beam in response to load. For example, the load end of the cell may carry a mask for interrupting the light beam of a photoelectric measuring device to a greater or less extent. Another possibility is the use of a core mounted on the beam to operate an induction type of measuring device such as that known as a linear variable differential transformer.

The term strain measuring device as used in the claims is intended to include any type of device suitable for measuring strain or bending of the load cell.

What I claim is:

1. A beam type of load cell, for use with strain measuring devices, comprising a strip of spring material of a width greater than its thickness having a transverse twist forming the strip into two portions disposed in planes substantially perpendicular to one another, said strip constituting the load responsive beam element of the cell.

2. A load cell as described in claim 1, each of said portions being straight.

3. A load cell as described in claim 2, having a strain gage mounted on one of said portions.

4. A load cell as described in claim 3, having a second strain gage mounted on the other of said portions.

5. A beam type of load cell, for use with strain measuring devices, comprising a strip of spring material of a width greater than its thickness having a transvesre twist forming the strip into two portions disposed in planes substantially perpendicular to one another, said strip constituting the load responsive beam element of the cell, one of said portions having flat front and rear faces and a bank of four strain gages mounted in corresponding pairs, two on each face.

6. A beam type of load cell, for use with strain measuring devices, comprising a strip of spring material of width greater than its thickness, said strip constituting the load responsive beam element of the cell and having a central portion and two legs disposed obliquely with respect to said central portion, and a rigid base to which said legs are secured, each of said legs having a transverse twist disposed intermediate said base and said central portion and forming a leg portion disposed in a plane substantially perpendicular to said central portion.

7. A load cell as described in claim 6, having a single leg on each side of said central portion.

8. A load cell as described in claim 6, said legs being disposed at a 60° angle with respect to one another.

9. A beam type of load cell, for use with strain measuring devices, comprising a strip of spring material of a width greater than its thickness, said strip constituting the load responsive beam element of the cell and having a central portion and two pairs of leg portions extending one pair from either side of said central portion, a rigid base to which said legs are secured, the legs in each pair being parallel to one another, and each leg having a transverse twist disposed intermediate said base and said central portion and forming a leg portion disposed in a plane perpendicular to said central portion.

10. A beam type of load cell, for use with strain measuring devices, comprising a strip of spring material of a width greater than its thickness, said strip constituting the load responsive beam element of the cell and having a central portion and two legs disposed obliquely with respect to said central portion, a rigid base to which said legs are secured, each of said legs having a transverse twist disposed intermediate said base and said central portion and forming a leg portion disposed in a plane perpendicular to said central portion, and said base having two opposed pairs of clamp edges, each pair disposed transversely with respect to and gripping one of said leg portions.

11. A beam type of load cell, for use with strain measuring devices, comprising a strip of spring material of a width greater than its thickness, said strip constituting the load responsive beam element of the cell and having a central portion and two legs disposed at right angles to said central portion and parallel to one another, a rigid base to which said legs are secured, each of said legs having a transverse twist disposed intermediate said base and said central portion and forming a leg portion disposed in a plane perpendicular to said central portion.

12. A load cell as described in claim 11, said twists being disposed at the same distance from said base.

13. A load cell as described in claim 11, said twists being disposed at different distances from said base.

References Cited by the Examiner

UNITED STATES PATENTS

| | | | |
|---|---|---|---|
| 1,540,298 | 6/1925 | White | 177—229 X |
| 2,033,318 | 3/1936 | Abramson | 177—229 X |
| 2,737,051 | 3/1956 | Sanderson | 73—88.5 X |
| 3,077,783 | 2/1963 | Stiles et al. | 73—517 |

RICHARD C. QUEISSER, *Primary Examiner.*

C. A. RUEHL, *Assistant Examiner.*